(12) United States Patent
Bae et al.

(10) Patent No.: US 11,190,815 B2
(45) Date of Patent: Nov. 30, 2021

(54) MULTIMEDIA SERVICE CONTENT PROVIDING DEVICE AND METHOD

(71) Applicant: Samsung Electronics Co., Ltd., Suwon-si (KR)

(72) Inventors: Jae-Hyeon Bae, Seoul (KR); Dong-Yeon Kim, Seoul (KR); Kyung-Mo Park, Seoul (KR); Young-Wan So, Gunpo-si (KR); Hyun-Koo Yang, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 147 days.

(21) Appl. No.: 16/488,828

(22) PCT Filed: Mar. 29, 2018

(86) PCT No.: PCT/KR2018/003741
§ 371 (c)(1),
(2) Date: Aug. 26, 2019

(87) PCT Pub. No.: WO2018/182339
PCT Pub. Date: Oct. 4, 2018

(65) Prior Publication Data
US 2021/0136425 A1    May 6, 2021

(30) Foreign Application Priority Data
Mar. 29, 2017    (KR) .................. 10-2017-0040310

(51) Int. Cl.
*H04L 29/12* (2006.01)
*H04N 21/2381* (2011.01)
(Continued)

(52) U.S. Cl.
CPC ... *H04N 21/2381* (2013.01); *H04L 29/12066* (2013.01); *H04L 65/4084* (2013.01); *H04L 65/608* (2013.01); *H04N 21/64322* (2013.01)

(58) Field of Classification Search
CPC ......... H04N 21/2381; H04N 21/64322; H04N 21/2343; H04L 29/12066; H04L 65/4084;
(Continued)

(56) References Cited

U.S. PATENT DOCUMENTS

| 6,718,390 B1 | 4/2004 | Still et al. |
| 2007/0174491 A1 | 7/2007 | Still et al. |

(Continued)

FOREIGN PATENT DOCUMENTS

| CN | 101540759 A | 9/2009 |
| CN | 103731481 A | 4/2014 |

(Continued)

OTHER PUBLICATIONS

European Office Action dated Oct. 16, 2020, issued in European Application No. 18 775 510.3-1213.
(Continued)

*Primary Examiner* — John R Schnurr
(74) *Attorney, Agent, or Firm* — Jefferson IP Law, LLP

(57) ABSTRACT

The present disclosure relates to a method and device for receiving a content by a terminal device. The method for receiving a content by a terminal device comprises the steps of: transmitting a query message requesting content-related information to a first server; receiving a response message including the content-related information from the first server; on the basis of the response message, requesting a content from a second server corresponding to the content-related information; and receiving the content from the second server, wherein the content-related information includes internet protocol (IP) addresses of the second (Continued)

server, pieces of port information, and pieces of media information relating to a content.

10 Claims, 4 Drawing Sheets

(51) Int. Cl.
*H04L 29/06* (2006.01)
*H04N 21/643* (2011.01)

(58) Field of Classification Search
CPC . H04L 65/608; H04L 65/4092; H04L 65/601; H04L 69/30; H04L 65/80; H04L 29/06; H04L 29/08
See application file for complete search history.

(56) References Cited

U.S. PATENT DOCUMENTS

| | | | |
|---|---|---|---|
| 2009/0327517 A1* | 12/2009 | Sivasubramanian | ... H04L 67/02 709/238 |
| 2011/0219109 A1 | 9/2011 | Zehavi et al. | |
| 2012/0110148 A1* | 5/2012 | Liu | ............ H04L 61/1541 709/220 |
| 2012/0110418 A1 | 5/2012 | Ma | |
| 2012/0173677 A1 | 7/2012 | Richardson et al. | |
| 2013/0031197 A1 | 1/2013 | Delos Reyes et al. | |
| 2013/0246612 A1 | 9/2013 | Leighton et al. | |
| 2015/0020138 A1 | 1/2015 | Bae | |
| 2017/0171287 A1* | 6/2017 | Famaey | ........... H04N 21/85406 |
| 2018/0309713 A1* | 10/2018 | Brown | ................. G06F 16/951 |

FOREIGN PATENT DOCUMENTS

| | | |
|---|---|---|
| CN | 103780654 A | 5/2014 |
| CN | 103888358 A | 6/2014 |
| CN | 104301415 A | 1/2015 |
| CN | 104427353 A | 3/2015 |
| KR | 10-2010-0020911 A | 2/2010 |
| KR | 10-2014-0035385 | 3/2014 |
| KR | 10-2015-0046675 | 4/2015 |
| KR | 10-2017-0021098 | 2/2017 |

OTHER PUBLICATIONS

European Search Report dated Nov. 27, 2019, issued in European Patent Application No. 18775510.3.
Chinese Office Action dated May 28, 2021, issued in Chinese Patent Application No. 201880023168.0.

* cited by examiner

MULTIMEDIA SERVICE CONTENT PROVIDING DEVICE AND METHOD

CROSS-REFERENCE TO RELATED APPLICATION(S)

This application is a U.S. National Stage application under 35 U.S.C. § 371 of an International application number PCT/KR2018/003741, filed on Mar. 29, 2018, which is based on and claimed priority of a Korean patent application number 10-2017-0040310, filed on Mar. 29, 2017, in the Korean Intellectual Property Office, the disclosure of which is incorporated by reference herein in its entirety.

BACKGROUND

1. Field

The present disclosure relates to a method and apparatus for providing multimedia service based on a broadcasting network.

2. Description of the Related Art

The recent trend of broadcast service is toward multimedia service in which broadcast service is converged with communication service. The multimedia service requires a broadband network enabling fast information transfer as well as terminals enabling fast information processing.

The multimedia service is under development, with high-definition and large-capacity content focused on. The resulting rapid growth of data traffic in the multimedia service may obstruct active provisioning of the multimedia service.

SUMMARY

To provide the multimedia service actively, there is a need for efficiently managing traffic in a broadcasting network. One approach to this issue is for over the top (OTT) service providers that provide content over the Internet or communication service providers to install content delivery network (CDN) servers or content servers within communication operator networks. That is, edge servers are added to a center server which solely provides content, such that a terminal may receive content from a nearby edge server. In this case, data traffic load such as server overload, access speed delay, and so on should be managed for each edge server.

According to various embodiments of the disclosure, there are provided an apparatus and method for performing scheduling such that a plurality of servers distributedly process one piece of content for a plurality of terminals.

According to various embodiments of the disclosure, an apparatus and method are provided for allowing a terminal to control data traffic by a domain name system (DNS) response message received from a DNS server.

According to various embodiments of the disclosure, an apparatus and method are provided for allocating a content service in consideration of the number of terminals using content, the location of a content providing server, and so on.

According to various embodiments of the disclosure, an apparatus and method are provided for providing port information and media information about the content, which are required to use content, as well as an Internet protocol (IP) address of a content providing server in a DNS message.

In accordance with an aspect of the present disclosure, a method of receiving content in a terminal includes transmitting a query message requesting content-related information to a first server, receiving a response message including the content-related information from the first server, requesting content to a second server based on the content-related information included in the response message, and receiving the content from the second server. The content-related information includes Internet protocol (IP) addresses of the second server, port information, and media information about the content.

In accordance with an aspect of the present disclosure, a method of transmitting content-related information in a first server includes receiving a query message including a media resource URL from a terminal, and transmitting a response message including content-related information to the terminal in response to the query message. The content-related information corresponds to the media resource URL, and includes IP addresses of a second server providing content of the media resource URL, port information, and media information about the content.

In accordance with an aspect of the present disclosure, a terminal for receiving content includes a processor and a transceiver. The transceiver is configured to transmit a query message requesting content-related information to a first server, to receive a response message including the content-related information from the first server, to request content to a second server based on the content-related information included in the response message, and to receive the content from the second server. The content-related information includes IP addresses of the second server, port information, and media information about the content.

In accordance with an aspect of the present disclosure, a first server for transmitting content-related information receives a query message including a media resource URL from a terminal, and transmits a response message including content-related information to the terminal in response to the query message. The content-related information corresponds to the media resource URL, and includes Internet protocol (IP) addresses of a second server providing content of the media resource URL, port information, and media information about the content.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
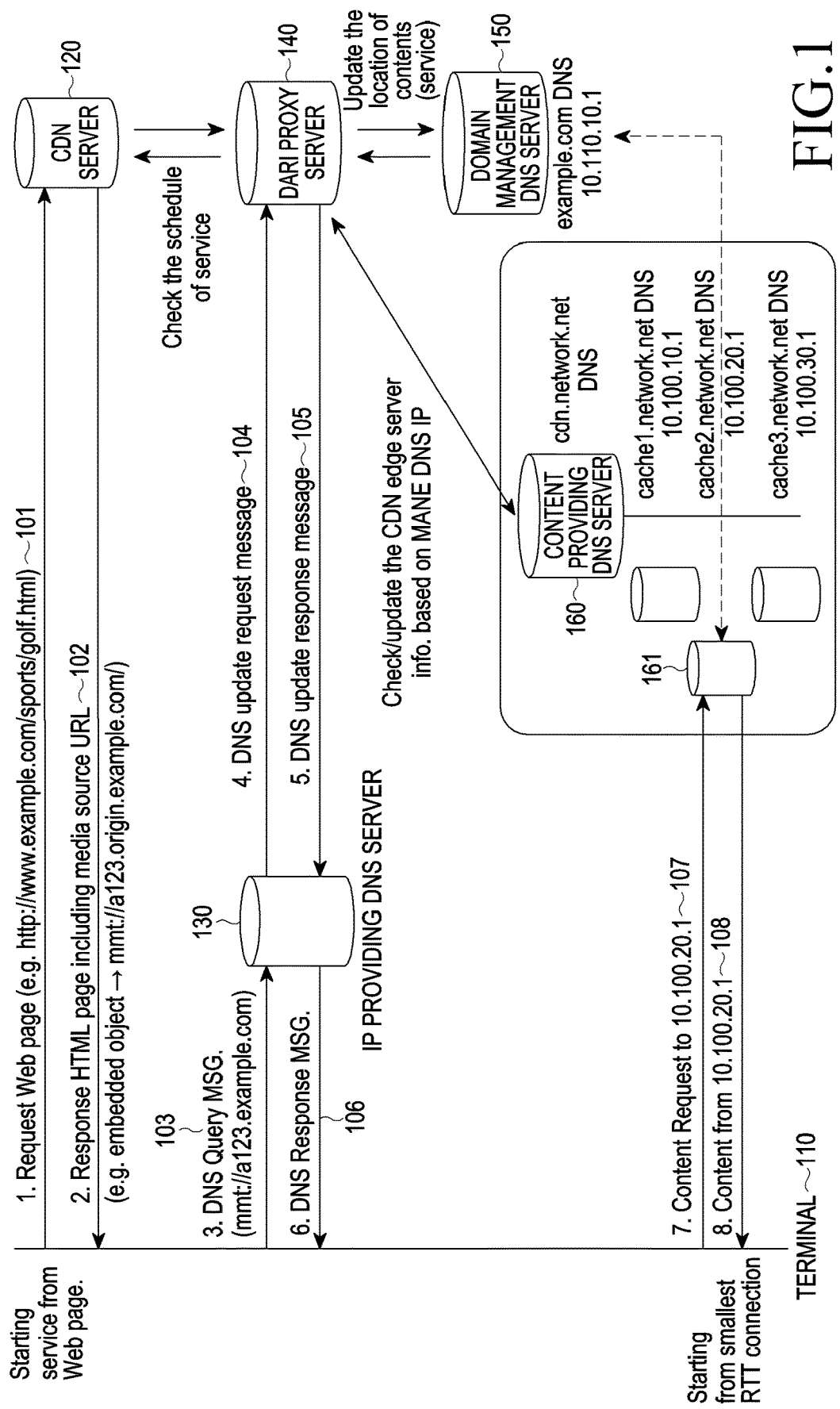
FIG. 1 is a diagram illustrating an exemplary environment in which multimedia service is provided according to an embodiment of the disclosure.

Reference will be made to embodiments of the present disclosure.

A description of techniques which are known in the technical field of the present disclosure and are not related directly to the present disclosure will be omitted lest it should obscure the subject matter of the present disclosure.

Likewise, some components are exaggerated, omitted, or schematically shown in the attached drawings and the size of each component does not fully reflect its actual size. Like reference numerals denote the same or corresponding components in the drawings.

The advantages and features of the present disclosure, and a method for achieving them will be apparent from the attached drawings and the following detailed description of embodiments. However, the present disclosure may be implemented in various ways, not limited to the following embodiments. Rather, the embodiments are provided to make the present disclosure comprehensive and help those skilled in the art to comprehensively understand the scope of the present disclosure, and the present disclosure is defined only by the appended claims. The same reference numerals denote the same components throughout the specification.

Further, blocks of a flowchart and a combination of flowcharts may be executed by computer program instructions. Since these computer program instructions may be loaded on a processor of a general purpose computer, a special purpose computer, or other programmable data processing equipment, the instructions executed by the processor of the computer or other programmable data processing equipment create means for carrying out functions described in the block(s) of the flowcharts. As the computer program instructions may be stored in a memory usable in a specialized computer or a programmable data processing equipment, or a computer readable memory, it is also possible to create articles of manufacture that carry out functions described in the block diagram(s) of the flowcharts. As the computer program instructions may be loaded on a computer or a programmable data processing equipment, when executed as processes, they may carry out steps of functions described in the block(s) of the flowcharts.

Each block may correspond to a module, a segment or a code containing one or more executable instructions implementing one or more specified logical functions. It is to be noted that in alternative embodiments, it is also possible to execute functions described in blocks in an order different from the listed order. For example, two blocks listed in sequence may be executed substantially at the same time or executed in reverse order according to corresponding functions, when needed.

In the description, the word "unit" may refer to a software component or hardware component such as a field-programmable gate array (FPGA) or application-specific integrated circuit (ASIC). However, "unit" is not limited to hardware or software. A "unit" may be configured so as to reside in an addressable storage medium or to drive one or more processors. Therefore, units or the like may refer to components such as software components, object-oriented software components, class components, and task components, processes, functions, attributes, procedures, subroutines, program code segments, drivers, firmware, microcode, circuits, data, databases, data structures, tables, arrays, and variables. A function provided by a component and 'unit' may be a combination of smaller components and 'units', and may be combined with others to compose large components and units. Components and units may be configured to drive a device or one or more central processing units (CPUs) in a secure multimedia card.

While the embodiments of the present disclosure are described mainly in the context of an orthogonal frequency division multiplexing (OFDM)-based wireless communication system, those skilled in the art will appreciate that the subject matter of the present disclosure is applicable to other systems and services having similar technical backgrounds without departing from the scope and spirit of the present disclosure.

FIG. 1 is a diagram illustrating an exemplary environment in which a multimedia service is provided according to an embodiment of the present disclosure.

Referring to FIG. 1, a content providing environment includes a terminal 110 receiving content, a content delivery network (CDN) server 120 being a service provider server that provides a uniform resource locator (URL) of content, an internet protocol (IP) providing domain name system (DNS) server 130 providing an IP address based on a URL, and a dynamic address resource identification (DARI) proxy server 140 storing media information about content and information about servers that provide the content. Further, the content providing environment includes a domain management DNS server 150 being a server that manages a domain corresponding to a media resource URL, and a content providing server 160 that stores content.

The terminal 110 accesses a content providing domain to receive content in operation 101. Herein, the terminal 110 requests a web page of a domain corresponding to an input value to the CDN server 120. For example, the terminal 110 may receive a domain address, http://www.example.com/sports/golf.html from a user and request the web page at the domain address to the CDN server 120.

The terminal 110 receives a hypertext markup language (HTML) page including a media resource URL that provides the content from the CDN server 120 in operation 102. For example, the terminal 110 may receive a web page including a media resource URL, mmmt://123.origin.example.com. Content corresponding to the media resource URL may be a video, a subtitle, an audio, or the like. While reception of an HTML page including one media resource URL has been described by way of example, an HTML page including multiple media resource URLs such as mmt://124.origin.example.com and mmt://125.origin.example.com may be received.

The terminal 110 transmits a DNS query message including the media resource URL to the IP providing DNS server 130 in operation 103. The DNS query message is used to request the IP address of a content providing server that provides the content of the media resource URL. For example, the terminal 110 may transmit the DNS query message including mmt://a123.example.com to the IP providing DNS server 130. Herein, a123 is an identifier of content. The IP providing DNS server 130 may be near to the location of the terminal 110. For example, it is assumed that the DNS query message includes one media resource URL. However, the DNS query message may include multiple media resource URLs such as mmt://a124.origin.example.com and mmt://a125.origin.example.com.

The DNS query message may include QNAME, QTYPE, and QCLASS. QNAME represents the domain name part of the URL, and QTYPE represents the type of the query, that is, a resource record (RR) to be returned in a response. The RR may be an address (A) RR, a service (SRV) RR, and/or a text (TXT) RR. The A RR, SRV RR, and/or TXT RR will be described below in detail. Further, QCLASS represents a class field, for example, internet (IN).

If the IP providing DNS server 130 stores content service information corresponding to the media resource URL, the IP providing DNS server 130 may transmit a DNS response message to the terminal 110 in operation 106. The DNS response message may include the content service information. For the specific structure of the DNS response message, refer to the following description. If the IP providing DNS server 130 stores the content service information corresponding to the media resource URL, a later-described operation of transmitting a DNS update request message and a DNS update response message between the IP providing DNS server 130 and DARI proxy server 140 may not be performed.

If the IP providing DNS server 130 does not store the content service information corresponding to the media resource URL, the IP providing DNS server 130 may transmit a DNS update request message to the DARI proxy server 140 in operation 104. For example, the IP providing DNS server 130 stores content service information to be provided to the $1^{st}$ to $200^{th}$ terminals which have accessed the DNS server and requested content service information. However, the IP providing DNS server 130 does not store content service information to be provided to a $201^{st}$ terminal that has accessed the DNS server. The $1^{st}$ to $201^{st}$ terminals which have accessed the DNS server need content service information corresponding to the same media resource URL. Therefore, the IP providing DNS server 130 may request, to the DARI proxy server 140, content service information to be provided to one or more terminals that access the DNS server after the $200^{th}$ terminal.

Specifically, the IP providing DNS server 130 transmits a DNS update request message including the media resource URL to the DARI proxy server 140.

The DARI proxy server 140 transmits a DNS update response message to the IP providing DNS server 130 in response to the DNS update request message in operation 105. The DNS update response message may include a plurality of A RRs, SRV RRs, and TXT RRs corresponding to the content service information. In the case where a plurality of IP addresses are allocated to a content providing server and there are a plurality of pieces of port information and a plurality of pieces of media information for content, there may be a plurality of A RRs, SRV RRs, and TXT RRs. A plurality of uniform resource identifier (URI) RRs may be included in place of a plurality of SRV RRs.

An A RR providing the IP address of the content providing DRS server 160 is configured as follows.

Owner-Name ttl Class rr ipv4

Herein, Owner-name specifies the owner or service provider of the media resource URL, and ttl (time to live) specifies the valid duration of the DNS update response message. Further, class indicates a class in which the DNS update response message is delivered, and rr indicates the type of the record resource. Internet protocol version 4 (ipv4) indicates an IP address corresponding to the media resource URL. The IP address may be Internet protocol version 6 (ipv6), not limited to ipv4.

For example, if the IP address of a content providing server corresponding to "a123.origin.example.com" is 10.100.20.1, the duration time of a DNS update response message is 14400 seconds, the DNS update response message is provided over the Internet (IN), and the type of a resource record is A, that is, an IP address, an A RR is configured as follows.

a123.origin.example.com 14400 IN A 10.100.20.1

A SRV RR which provides port information required to use content of the content providing server 160 is configured as follows.

MMT(Service)._proto.name TTL Class SRV Priority Weight Port Target

MMT(Service)._proto.name specifies the operator or owner of a server that provides a content service. Specifically, Service is the name of an intended service such as http or telet. Further, _proto specifies the symbol name of an intended protocol such as transmission control protocol (TCP) or user datagram protocol (UDP). Name specifies the name of a domain to which the RR refers, that is, the name of the service provider that provides the content.

TTL represents the valid duration of the DNS update response message. That is, TTL specifies a time interval at which a corresponding SRV RR may be cached before the next SRV RR to be transmitted to the mobile device 110, for example, the second SRV RR is referred to. Class may be information identifying a class in which the DNS update response message is delivered, that is, an RR type. For example, an SRV record is serviced through the internet (IN). SRV represents a code RR that provides the service. Priority indicates the location of an original media source or the priority level of a server. The terminal 110 may attempt to connect to a server having a lowest priority. Weight represents a load balancing mechanism in which if two or more SRV RRs of the same domain have the same priority, the terminal 110 may attempt to request content based on an SRV RR having a higher weight. That is, a different IP address may be allocated according to a weight. Herein, the IP address refers to the IP address of the content providing server. The terminal 110 may select an appropriate URL from among a plurality of received URIs by using information configured in an SRV RR having a high priority based on Priority and Weight. Port specifies the port number of the content providing server, and target specifies the domain name of a host supporting the service. Herein, target indicates the location of the original media resource for MMT streaming service. The MMT streaming service transfers a media resource by using part of the name of the domain providing content via MMTP. That is, a legacy URL starting with http:// is provided as a URL starting with mmt:// in MMT.

For example, an SRV RR corresponding to "a123.origin.example.com" is configured as follows.

_mmt._udp.example.com 14400 IN SRV 1 100 53 a123.origin.example.com.

With the use of the SRV RR, a specific content providing service, a protocol, and the location of a server of a service provider may be specified. The location of the server of the service provider may be the location of a content providing server.

A URI RR may substitute for an SRV RR in a DNS update response message. Unlike an SRV RR for which available URIs should be searched for and assembled from result information, a URI text string included in a URI RR may be used directly in an application program of the terminal 110.

A URI RR that provides port information required to use content of the content providing server 160 may be configured as follows.

Owner-Name TTL Class URI Priority Weight Target

Herein, Owner-name, TTL, Class, Priority, Weight, and Target are identical to their counterparts in the SRV RR. Compared to the SRV RR, the URI RR includes port information in the URI, and thus does not include Port. The URI corresponds to a media resource URL. A different service provider exists for each content providing service, and service information corresponding to the content providing service is encoded with the name of the service provider.

For example, a URI RR corresponding to "a123.origin.example.com" is configured as follows.

_mmt._udp in URI 0 10
"mmt://a123.origin.example.com:53/package1/asset1/1.mpu"

A TXT RR that provides media information about content is configured as follows.

Owner Class ttl TXT "<Attribute Name>=<Attribute Value>"

"<attribute name>=<attribute value>" of the TXT RR may include a service provider ID in MMT, that is, a unique package ID, MMT_package_id for the terminal 110, the ID of a content type such as video, audio, or subtitle, that is, the ID of an asset included in the content (MMT package), Asset_id, and the starting MPU sequence number (the first MPU sequence number of the asset) and ending MPU sequence number (the last 1VIPU sequence number of the asset), MPU_sequence_number of MPUS provided by the content providing server among the MPUs of the content. The content providing server corresponds to the IP address included in the A RR.

For example, if content corresponding to "a123.origin.example.com" is provided by company A, "MMT_package_id=1", if the content corresponding to "a123.origin.example.com" is subtitle, "asset_id=1", and if the starting and ending sequence numbers of MPUs provided by a service having an IP address of 10.100.20.1 among the MPUs of the content are 1 and 10, respectively, "Starting_number_of_mpu_sequence=1" and "Ending_number_of_mpu_sequence=10" are included in the TXT RR.

Further, "<attribute name>=<attribute value>" of the TXT RR may include IP_address_range. IP_address_range means an IP range of terminals to which the content providing server 160 is accessible. For example, if "Ip_address_range=192.168.0.101~192.168.0.200", this means that the terminal 110 having an IP address corresponding to 192.168.0.101~192.168.0.200 is allowed to access the content providing server 160.

For example, in the case where 200 terminals are allowed to access a content providing server located in region A, it may occur that $201^{st}$ or more terminals access the content providing server. As such, if the number of terminals allowed to access the content providing server is exceeded, the terminals may be distributed to region B or region C based on the information of IP_address_range in the TXT RR. The IP providing DNS server 130 may determine the number of terminals which have accessed the content providing server by the number of DNS request messages. The terminal 110 may request content to the content providing server with IP_address_range corresponding to its IP address.

If more terminals than the allowed number of accesses in IP_address_range stored in the IP providing DNS server 130 transmit DNS request messages, the IP providing DNS server 130 requests an A RR, an SRV RR, and a TXT RR to be provided to more terminals than the allowed number of accesses to the DARI proxy server 140. The DARI proxy server 140 may generate an A RR, an SRV RR, and a TXT RR based on media information about content and the location of the content.

Herein, the DARI proxy server 140 may update scheduling of the content providing service, for example, an allowed time to use content service in the content providing server by communicating with the CDN server 120. Further, the DARI proxy server 140 may update a location in which the content corresponding to the media resource URL is stored, for example, the IP information and port information about the content providing server by communicating with the domain management DNS server 150 being a server that manages domains.

Further, "<attribute name>=<attribute value>" of the TXT RR may include video_resolution. Video_resolution means the resolution of the content. For example, "video_resolution=720 p" means that the content resolution is 720 p. The terminal 110 may identify the resolution of the content based on video_resolution included in the TXT RR.

For example, a TXT RR corresponding to "a123.origin.example.com" is given as follows.

a123.origin.example.com IN 14400 TXT "Ip_address_range=192.168.0.1~192.168.0.100" "video resolution=720 p" "service_start=5" "service_duration=3600" "mmt_package_id=1" "asset_id=1" "Starting_number_of_mpu_sequence=1" "End_number_of_mpu_sequence=10"

If the resolution of the content is 1080 p, the TXT RR is given as follows.

a123.origin.example.com IN 14400 TXT "Ip_address_range=192.168.0.1~192.168.0.100" "video_resolution=1080 p" "service_start=5" "service_duration=3600" "mmt_package_id=1" "asset id=11" "Starting_number_of_mpu_sequence=1" "End_number_of_mpu_sequence=10"

If the IP providing DNS server 130 performs DNS update, the DARI proxy server 140 may provide at least one TXT RR including partial "<attribute name>=<attribute value>", as follows.

a123.origin.example.com IN 14400 TXT "IP_address_range=10.20.0.1~10.20.0.100"

a123.origin.example.com IN 14400 TXT"mmt_package_id=1"

a123.origin.example.com IN 14400 TXT"asset_id=1"

a123.origin.example.com IN 14400 TXT "Starting_number_of_mpu_sequence=1"

a123.origin.example.com IN 14400 TXT "End_number_of_mpu_sequence=10"

The IP providing DNS server 130 transmits a DNS response message to the terminal 110 in response to reception of the DNS update response message in operation 106. The DNS response message includes an A RR, an SRV RR, a TXT RR, and/or a URI RR.

If receiving a DNS query message including a media resource URL, for example, origin.example.com/sports/video.mp4 from the terminal 110, the IP providing DNS server 130 transmits a DNS query message including origin.example.com to the domain management DNS server 150 that manages the domain of the URL. Herein, the DNS query message may not include '/sports/video.mp4/' of the media resource URL. The IP providing DNS server 130 receives a DNS response message from the domain management DNS server 150. The DNS response message may include the URL of the content providing server 160 that stores content corresponding to origin.example.com. For example, the DNS response message may include csp123.cdn.network.net as the URL of the content providing server.

The IP providing DNS server 130 receives the DNS response message including an IP address corresponding of the URL of the content providing server 160. The IP providing DNS server 130 transmits the DNS response message to the terminal 110.

The DNS response message may include the IP address corresponding to the URL of the content providing server 160. That is, the IP providing DNS server 130 has received only the A RR including the IP address of the content providing server 160, without the SRV RR that includes the port information and the TXT RR that includes media information about content, for example, the service provider ID, MMT_package_id, the content type ID such as video, audio, and subtitle, Asset_id, and the starting and ending sequence numbers of MPUs provided by the server, MPU_sequence_number, among the MPUs of the content, and distributed access information about the content providing server 160, for example, the IP range of terminals allowed to access the content providing server 160. Accordingly, when content requests are concentrated on the specific content providing server 160, the terminal 110 may not receive content reliably.

Moreover, since the IP providing DNS server 130 should transmit a DNS query message to the domain management DNS server 150 and the content providing server 160 in order to obtain an IP address corresponding to a media resource URL, fast processing may be difficult.

The terminal 110 requests the content to the content providing server 160 based on the DNS response message received from the IP providing DNS server 130 in operation 107.

The DNS response message may include a plurality of A RRs, SRV RRs, and TXT RRs related to the content providing server that provides the content. The terminal 110 detects a TXT RR including IP_address_range corresponding to its IP address from among the plurality of TXT RRs. The terminal 110 may detect an A RR and a SVR RR corresponding to the detected TXT RR, and thus identify the content providing server that provides the content.

The IP address of the content providing server 160 may be the address of a cache 161 of the content providing server 160.

Further, the terminal 110 may request, for example, content having a resolution of 720 p for "mmt_package_id=1" and "asset_id=1". If the terminal 110 intends to request higher-resolution content, the terminal 110 may request the content based on information included in a TXT RR corresponding to a resolution of 1020 p. Herein, the TXT RR may include "mmt_package_id=1" and "asset id=11".

If the received TXT RR does not include the media information about the content requested by the terminal 110, the terminal 110 may not use the requested content, or may request the media resource URL again to the CDN server 120.

The terminal 110 receives the content from the cache 61 of the content providing server 160 in operation 108.

The terminal 110 may output the received content on a display.

Figure 2:
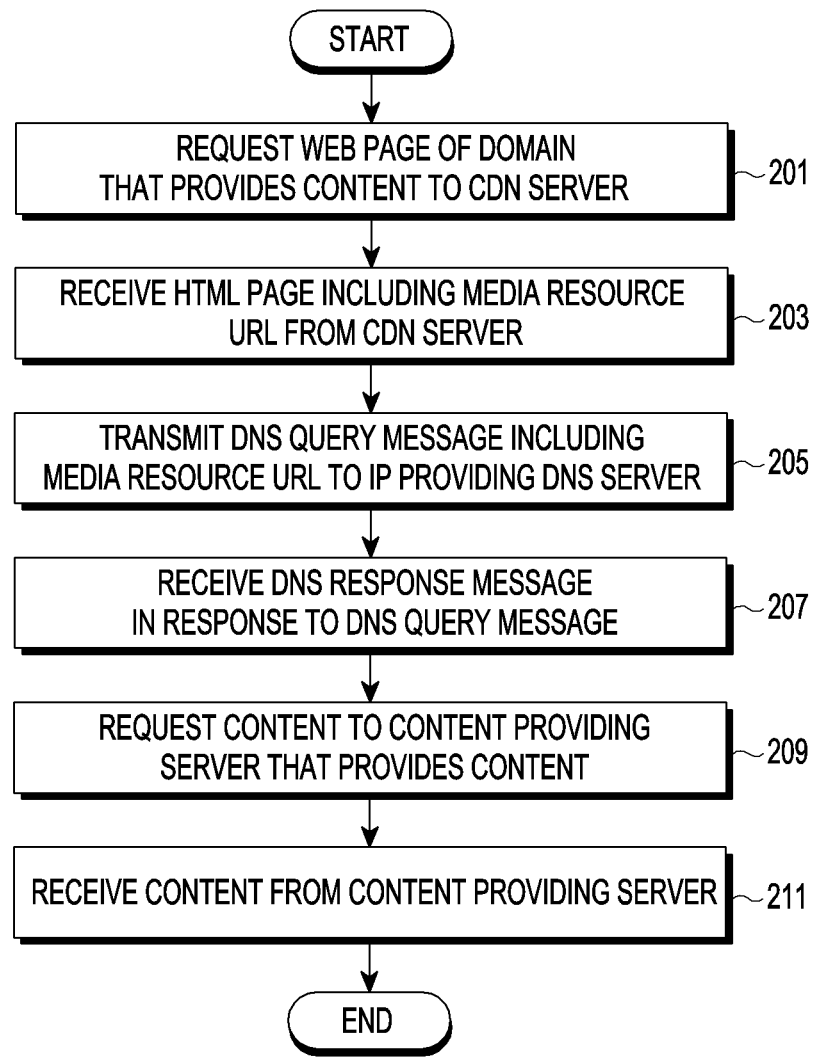
FIG. 2 is a flowchart illustrating a content providing sequence in a terminal according to an embodiment of the disclosure.

FIG. 2 is a diagram illustrating a content providing sequence in a terminal according to an embodiment of the present disclosure.

Referring to FIG. 2, the terminal requests a web page of a domain that provides desired content to a CDN server in operation 201.

The terminal receives an HTML page including a media resource URL from the CDN server in operation 203. The media resource URL corresponds to the desired content.

The terminal transmits a DNS query message including the media resource URI to the IP providing DNS server 130 in operation 205. The DNS query message is used to request the IP address of a content providing server that provides the content of the media resource URL.

The terminal receives a DNS response message in response to the DNS query message in operation 207. The DNS response message may include a plurality of A RRs, SRV RRs, and TXT RRs as media information about the content.

An A RR provides information about the IP address of the content providing server, and a SRV RR provides port information required to use the content provided by the content providing server. A TXT RR provides media information about the content, such as a content type ID, an MPU sequence number of the content provided by the content providing server, a content resolution, an IP range of terminals allowed to access the content providing server, and so on.

The terminal may request the content to the content providing server that provides content, based on the plurality of A RRs, SRV RRs, and TXT RRs included in the DNS response message in operation 209.

The terminal detects a TXT RR including IP address range corresponding to the IP address of the terminal, from among the plurality of TXT RRs. The terminal identifies the content providing server that provides the desired content, based on an A RR and a SRV RR corresponding to the detected TXT RR.

The terminal may request the desired content to the content providing server and receive the desired content from the content providing server in operation 211.

The terminal may receive the content in real time by an Internet-based MMT media streaming service.

Figure 3:
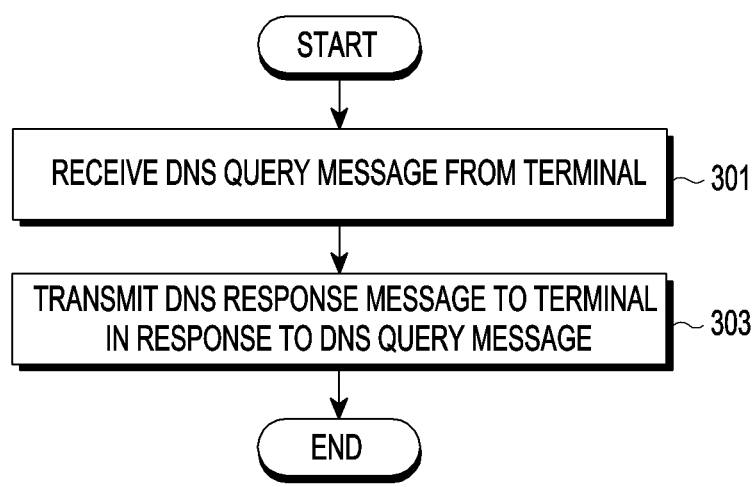
FIG. 3 is a flowchart illustrating a content providing sequence in an Internet protocol (IP) providing domain name system (DNS) server according to an embodiment of the disclosure.

FIG. 3 is a flowchart illustrating a content providing sequence in an IP providing DNS server according to an embodiment of the present disclosure.

Referring to FIG. 3, the IP providing DNS server receives a DNS query message from a terminal in operation 301. The DNS query message requests the IP address of a content providing server that provides content and includes a media resource URL corresponding to content.

The IP providing DNS server transmits a DNS response message to the terminal in response to the DNS query message in operation 303. The DNS response message includes information required to receive the content corresponding to the media resource URL.

Specifically, the IP providing DNS server may transmit, to the terminal, the DNS response message including information required to receive the content, for example, port information and media information about the content as well as the IP address of the content providing server.

The IP providing DNS server may not have stored the IP address of the content server corresponding to the media resource URL requested by the terminal, the port information, and the media information about the content. Further, the IP providing DNS server has already stored the IP addresses of content providing servers corresponding to media resource URLs, port information, media information about content, and the number of terminals to be deployed in the content providing server. However, the IP providing DNS server may not include the IP address of the content server for deployment of the terminal, the port information, and the media information about the content.

For example, the IP providing DNS server may have already stored the IP addresses of content providing servers, port information, and media information about content, to be provided to the $1^{st}$ to $10^{th}$ terminals which have accessed the IP providing DNS server. The IP providing DNS server may not have stored the IP address of a content server, port information, and media information about content, to be provided to the $11^{th}$ terminal which has accessed the IP providing DNS server.

In this case, the IP providing DNS server may request the IP address of the content server, the port information, and the media information about the content to the DARI proxy server for providing the requested information to the 11$^{th}$ terminal. The IP providing DNS server may transmit the request in a DNS update request message to the DARI proxy server.

The IP providing DNS server may receive a DNS update response message from the DARI proxy server in response to the DNS update request message. The DNS update response message may include the IP address of the content server as an A RR, the port information as a SRV RR, and the media information about content as a TXT RR.

The IP providing DNS server may have stored information about the location of the content providing server corresponding to the media resource URL requested by the UE and the media information about the content. In this case, the IP providing DNS server may provide the IP address of the content providing server corresponding to the media resource URL, the port information, and the media information about the content to the terminal without transmitting the DNS update request to the DARI proxy server.

Figure 4:
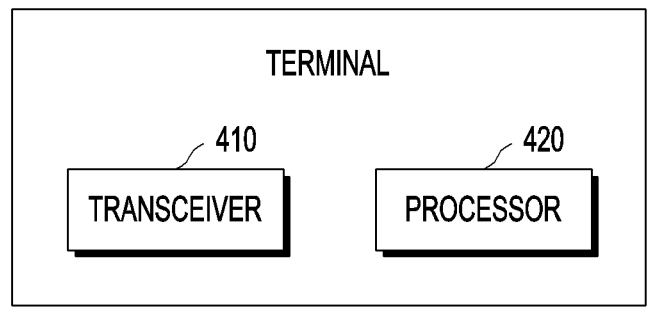
FIG. 4 is a block diagram illustrating a terminal in a content providing environment according to an embodiment of the disclosure.

FIG. 4 illustrates a terminal in a content providing environment according to an embodiment of the present disclosure.

Referring to FIG. 4, a terminal 400 includes a transceiver 410 and a processor 420.

The transceiver 410 of the terminal 400 may request a web page of a domain that provides content to a CDN server, and receive an HTML page including a media resource URL from the CDN server. The transceiver 410 may transmit a DNS query message including the media resource URL to an IP providing DNS server and receive a DNS response message in response to the DNS query message from the IP providing DNS server. The transceiver 410 may request content to a content providing server that provides the content based on the DNS response message and receive the content from the content providing server.

The processor 420 of the terminal 400 may identify the content providing server that provides the content based on the DNS response message.

Figure 5:
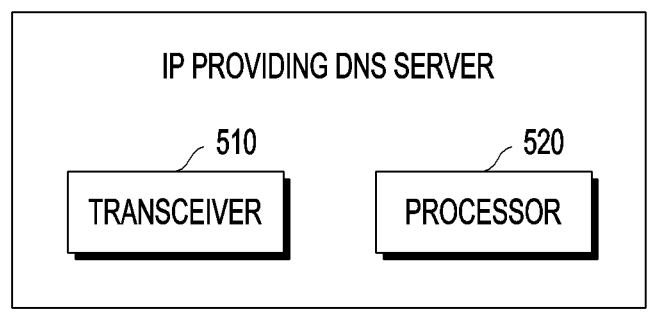
FIG. 5 is a block diagram illustrating an IP providing DNS server in a content providing environment according to an embodiment of the disclosure.

FIG. 5 illustrates an IP providing DNS server in a content providing environment according to an embodiment of the present disclosure.

Referring to FIG. 5, an IP providing DNS server 500 includes a transceiver 510 and a processor 520.

The transceiver 510 receives a DNS query message from a terminal and transmits a DNS response message to the terminal in response to the DNS query message.

In addition, the transceiver 510 may transmit a DNS update request message to a DARI proxy server and receive a DNS update response message from the DARI proxy server in response to the DNS update request message.

The processor 520 may determine whether information about the location of a content providing server corresponding to a media resource URL requested by the terminal and media information about content has already been stored.

Specific aspects of the disclosure may be implemented as a computer-readable code in a computer-readable recording medium. The computer-readable recoding medium is a data storage device capable of storing data readable by a computer system. Examples of the computer-readable recoding medium include read only memory (ROM), random access memory (RAM), compact disk read only memory (CD-ROM), magnetic tapes, floppy disks, optical data storage devices, and carrier waves (data transmission over the Internet). The computer-readable recoding medium may be distributed to networked computer systems, and thus the computer-readable code is stored and executed in a distributed manner. Further, skilled programmers in the art may easily interpret functional programs, code, and code segments constructed to achieve the present disclosure.

Further, the apparatus and method according to various embodiments of the disclosure can be implemented in hardware, software, or a combination thereof. The software may be stored in a volatile or non-volatile storage device such as ROM irrespective of erasable or rewritable, a memory such as RAM, a memory chip, a device, or an integrated circuit (IC), or an optically or magnetically writable and machine-readable (for example, computer-readable) storage medium such as a CD, a DVD, a magnetic disk, or a magnetic tape. The method according to various embodiments of the present disclosure can be performed by a computer or portable terminal including a controller and a memory, and the memory is an exemplary machine-readable storage medium suitable for storing a program or programs containing instructions that implement the embodiments of the present disclosure.

Accordingly, the present disclosure includes a program with a code that implements an apparatus or method disclosed in the claims, and a machine-readable (computer-readable or the like) storage medium storing the program. This program may be electronically transferred on a medium such as a communication signal transmitted via a wired or wireless connection, and the embodiments of the present disclosure appropriately include the equivalents.

In addition, the apparatus according to various embodiments of the present disclosure may receive and store a program from a wiredly or wirelessly connected program providing device. The program providing device may include a program containing instructions that control a program processor to perform a predetermined content protection method, a memory for storing information required for the content protection method, a communication unit for conducting wired or wireless communication with a graphic processor, and a controller for transmitting the program to a transceiver upon request of the graphic processor or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

Specific aspects of the disclosure may be implemented as a computer-readable code in a computer-readable recording medium. The computer-readable recoding medium is a data storage device capable of storing data readable by a computer system. Examples of the computer-readable recoding medium include read only memory (ROM), random access memory (RAM), compact disk read only memory (CD-ROM), magnetic tapes, floppy disks, optical data storage devices, and carrier waves (data transmission over the Internet). The computer-readable recoding medium may be distributed to networked computer systems, and thus the computer-readable code is stored and executed in a distributed manner. Further, skilled programmers in the art may easily interpret functional programs, code, and code segments constructed to achieve the present disclosure.

Further, the apparatus and method according to various embodiments of the disclosure can be implemented in hardware, software, or a combination thereof. The software may be stored in a volatile or non-volatile storage device such as ROM irrespective of erasable or rewritable, a memory such as RAM, a memory chip, a device, or an integrated circuit (IC), or an optically or magnetically writable and machine-readable (for example, computer-readable) storage medium such as a CD, a DVD, a magnetic disk, or a magnetic tape. The method according to various embodiments of the present disclosure can be performed by a computer or portable terminal including a controller and a memory, and the memory is an exemplary machine-readable storage medium suitable for storing a program or programs containing instructions that implement the embodiments of the present disclosure.

Accordingly, the present disclosure includes a program with a code that implements an apparatus or method disclosed in the claims, and a machine-readable (computer-readable or the like) storage medium storing the program. This program may be electronically transferred on a medium such as a communication signal transmitted via a wired or wireless connection, and the embodiments of the present disclosure appropriately include the equivalents.

In addition, the apparatus according to various embodiments of the present disclosure may receive and store a program from a wiredly or wirelessly connected program providing device. The program providing device may include a program containing instructions that control a program processor to perform a predetermined content protection method, a memory for storing information required for the content protection method, a communication unit for conducting wired or wireless communication with a graphic processor, and a controller for transmitting the program to a transceiver upon request of the graphic processor or automatically.

While the disclosure has been shown and described with reference to certain exemplary embodiments thereof, it will be understood by those skilled in the art that various changes in form and details may be made therein without departing from the spirit and scope of the disclosure as defined by the appended claims and their equivalents.

The invention claimed is:

1. A method of receiving content in a terminal, the method comprising:
   transmitting a domain name system (DNS) query message requesting content-related information to a first server;
   receiving a DNS response message including the content-related information from the first server; and
   receiving the content from a second server based on the content-related information included in the DNS response message,
   wherein the content-related information includes:
      a moving picture experts group (MPEG) media transport (MMT) service (SRV) resource record (RR) related to a location of each server for the content including the second server,
      an address (A) RR including an internet protocol (IP) address of the each server, and
      a text (TXT) RR including information related to an IP address range of each terminal, an identifier of each package in the content, an identifier of each asset included in a package, a starting sequence number of a media processing unit (MPU) of each asset, and an end sequence number of the MPU of each asset.

2. The method of claim 1, wherein the DNS query message includes a media resource uniform resource locator (URL) corresponding to the content.

3. The method of claim 1, further comprising:
   identifying an IP address range corresponding to an IP address of the terminal from the information related to the IP address range of each terminal;
   identifying, based on the IP address range, information related to a location of the second server and an IP address of the second server from the information related to the location of each server for the content including the second server and the information related to the IP address of each server; and
   transmitting a request message for requesting the content to the second server.

4. A method of transmitting content-related information in a first server, the method comprising:
   receiving a domain name system (DNS) query message requesting content-related information from a terminal;
   determining whether the content-related information to be provided to the terminal is stored;
   if the content-related information is not stored, transmitting a DNS updated request message to a third server;
   receiving a DNS update response message including content-related information from the third server; and
   transmitting a DNS response message including the content-related information to the terminal in response to the DNS query message,
   wherein the content-related information includes:
      a moving picture experts group (MPEG) media transport (MMT) service (SRV) resource record (RR) related to a location of each server for content including a second server,
      an address (A) RR including an internet protocol (IP) address of the each server, and
      a text (TXT) RR including information related to an IP address range of each terminal, an identifier of each package in the content, an identifier of each asset included in a package, a starting sequence number of a media processing unit (MPU) of each asset, and an end sequence number of the MPU of each asset.

5. The method of claim 4, wherein the DNS query message includes a media resource uniform resource locator (URL) corresponding to the content.

6. A terminal for receiving content, the terminal comprising:
   a transceiver; and
   at least one processor coupled to the transceiver,
   wherein the at least one processor is configured to:
      transmit a domain name system (DNS) query message requesting content-related information to a first server, to
      receive a DNS response message including the content-related information from the first server, and
      receive the content from a second server based on the content-related information included in the DNS response message, and
   wherein the content-related information includes:
      a moving picture experts group (MPEG) media transport (MMT) service (SRV) resource record (RR) related to a location of each server for the content including the second server,
      an address (A) RR including an internet protocol (IP) address of the each server, and
      a text (TXT) RR including information related to an IP address range of each terminal, an identifier of each package in the content, an identifier of each asset included in a package, a starting sequence number of a media processing unit (MPU) of each asset, and an end sequence number of the MPU of each asset.

7. The terminal of claim 6, wherein the DNS query message includes a media resource uniform resource locator (URL) corresponding to the content.

8. The terminal of claim 6, wherein the at least one processor is further configured to:
   identify an IP address range corresponding to an IP address of the terminal from the information related to the IP address range of each terminal,
   identify, based on the IP address range, information related to a location of the second server and an IP address of the second server from the information related to the location of each server for the content including second server and the information related to the IP address of each server, and
   transmit a request message for requesting the content to the second server.

9. A first server for transmitting content-related information, the first server comprising:
   a transceiver; and
   at least one processor coupled to the transceiver,
   wherein the at least one processor is configured to:
      receive a domain name system (DNS) query message requesting content-related information from a terminal,
      determine whether the content-related information to be provided to the terminal is stored,
      if the content-related information is not stored, transmit a DNS updated request message to a third server,
      receive a DNS update response message including content-related information from the third server, and
      transmit a DNS response message including the content-related information to the terminal in response to the DNS query message, and
   wherein the content-related information includes:
      a moving picture experts group (MPEG) media transport (MMT) service (SRV) resource record (RR) related to a location of each server for content including a second server,
      an address (A) RR including an internet protocol (IP) address of the each server, and
      a text (TXT) RR including information related to an IP address range of each terminal, an identifier of each package in the content, an identifier of each asset included in a package, a starting sequence number of a media processing unit (MPU) of each asset, and an end sequence number of the MPU of each asset.

10. The first server of claim 9, wherein the DNS query message includes a media resource uniform resource locator (URL) corresponding to the content.

* * * * *